(12) United States Patent
Kim et al.

(10) Patent No.: US 8,574,504 B2
(45) Date of Patent: Nov. 5, 2013

(54) PLASMA SCRUBBER

(75) Inventors: Kwan-Tae Kim, Daejeon (KR); Dae-Hoon Lee, Daejeon (KR); Young-Hoon Song, Daejeon (KR); Min-Suk Cha, Daejeon (KR); Jae-Ok Lee, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 1109 days.

(21) Appl. No.: 12/247,622

(22) Filed: Oct. 8, 2008

(65) Prior Publication Data

US 2009/0238728 A1 Sep. 24, 2009

(30) Foreign Application Priority Data

Mar. 21, 2008 (KR) ........................ 10-2008-0026123

(51) Int. Cl.
*B01J 19/08* (2006.01)
(52) U.S. Cl.
USPC ..................................................... 422/186
(58) Field of Classification Search
USPC ..................................................... 422/186
See application file for complete search history.

(56) References Cited

U.S. PATENT DOCUMENTS

| 4,002,466 | A | * | 1/1977 | MacRae et al. | ............... 75/10.22 |
| 7,591,242 | B2 | * | 9/2009 | Shih et al. | ..................... 123/297 |
| 2006/0232214 | A1 | * | 10/2006 | Seeley | .................... 315/111.21 |

FOREIGN PATENT DOCUMENTS

WO 2007043783 A1 4/2007

* cited by examiner

*Primary Examiner* — Dean Kwak
(74) *Attorney, Agent, or Firm* — Seed IP Law Group PLLC

(57) ABSTRACT

A plasma scrubber that forms a high temperature atmosphere in a reactor to effectively decompose and remove a non-biodegradable gas and reduce power consumption is disclosed. The plasma scrubber includes: a first reactor to which a non-biodegradable gas is supplied; an electrode installed in the first reactor and protruding in the flow direction of the non-biodegradable gas to generate plasma in the non-biodegradable gas supplied between the electrode and the first reactor by a discharge reaction in the first reactor; a second reactor connected to the first reactor to form continuous arc jets by anchoring the plasma to the electrode; and a third reactor connected to the second reactor to decompose the non-biodegradable gas by forming a reaction section of high temperature that contains electrons and chemical species of high reactivity in the second reactor and thereby increasing the stay time and reactivity of the non-biodegradable gas.

11 Claims, 9 Drawing Sheets

PLASMA SCRUBBER

BACKGROUND

1. Technical Field

The present invention relates generally to a plasma scrubber and, more particularly, to a plasma scrubber that enables decomposition of non-biodegradable gases with low cost.

2. Description of the Related Art

Gases that cause global warming include $CO_2$, $CH_4$, $N_2O$, HFC, and per-fluorocompounds (PFC). The per-fluorocompounds (PFC) are gases mainly used in display manufacturing processes and semiconductor manufacturing processes and include $CF_4$, $C_2F_6$, $SF_6$, and $NF_3$.

Global warming gases have stable molecular structures and are not easily biodegraded, so they are referred to as non-biodegradable gases. A technology for decomposing non-biodegradable gases is necessary to prevent environmental contamination and global warming caused by such non-biodegradable gases.

Methods for removing non-biodegradable gases include an oxidation method using combustion of gases, a method for chemically absorbing gases, and a decomposition method using plasma. The decomposition method using plasma is mainly used in removal of per-fluorocompounds.

The decomposition method using plasma uses a plasma torch generating plasma of high temperature in a reactor, in which case several tens or hundreds of kilowatts of power is consumed only to treat several tens or hundreds of liters per minute.

Non-biodegradable gases are decomposed in a reactor through thermal decomposition of the gases under a high temperature atmosphere or collisions of electrons of high energy and gas molecules. However, it is difficult to form in a reactor an expanded reaction section of high temperature in which electrons of high energy and chemical species of high reactivity are abundant.

BRIEF SUMMARY

The present invention has been made in view of the above problems, and the present invention provides a plasma scrubber that enables effective decomposition and removal of non-biodegradable gases by forming an expanded reaction section of high temperature in which electrons of high energy and chemical species of high reactivity are abundant.

The present invention also provides a plasma scrubber that enables effective decomposition and removal of non-degradable gases by forming a high temperature atmosphere in a reactor while reducing power consumption.

In order to achieve the objects, the present invention provides a plasma scrubber including: a first reactor to which a non-biodegradable gas is supplied; an electrode installed in the first reactor and protruding in the flow direction of the non-biodegradable gas to generate plasma in the non-biodegradable gas supplied between the electrode and the first reactor by a discharge reaction in the first reactor; a second reactor connected to the first reactor to form continuous arc jets by anchoring the plasma to the electrode; and a third reactor connected to the second reactor to decompose the non-biodegradable gas by forming a reaction section of high temperature that contains electrons and chemical species of high reactivity in the second reactor and thereby increasing the stay time and reactivity of the non-biodegradable gas.

The internal passage of the second reactor may become narrower as it goes from the first reactor to the third reactor.

The third reactor may have an inner diameter larger than the maximum inner diameter of the second reactor.

The electrode may include: an expansion section that becomes gradually expanded toward the inner surface of the first reactor as it goes from the first reactor to the second reactor; a maximum diameter section formed at an end of the expansion section; and a contraction section that becomes gradually contracted from the maximum diameter section.

The first reactor may include first gas supply holes and the first gas supply holes face the expansion section of the electrode. The first gas supply holes may be inclined with respect to the normal direction of the first reactor.

The electrode may include second gas supply holes connected to the outside and the second gas supply holes face the first reactor from the expansion section. The second gas supply holes may be inclined with respect to the normal direction of the electrode.

The plasma scrubber may further include an insulator mounted to the first reactor to electrically insulate and seal the electrode and the first reactor.

The first reactor may include: an inner cylinder into which the electrode is inserted; and an outer cylinder coupled to the outer side of the inner cylinder on the opposite side to the second reactor.

A supply line for supplying the non-biodegradable gas may be connected to the outer side of the outer cylinder, a gas chamber may be formed inside the outer cylinder, and first gas supply holes for supplying the non-biodegradable gas supplied to the gas chamber toward the electrode may be formed in the inner cylinder.

The electrode may include: an expansion section that becomes gradually expanded toward the inner surface of the first reactor as it goes from one side to the other side of the inner cylinder; a maximum diameter section formed at an end of the expansion section; and a contraction section that becomes gradually contracted from the maximum diameter section.

The plasma scrubber may further include an insulator mounted to the outer cylinder to electrically insulate the electrode and the inner cylinder and seal the outer cylinder and the electrode.

The non-biodegradable gas may be a per-fluorocompound gas. The non-biodegradable gas may be one of $CF_4$, $C_2F_6$, $SF_6$, and $NF_3$.

A cooling water supply passage and a cooling water discharge passage that supply cooling water into the electrode, and circulate and discharge the cooling water may be formed in the electrode.

The cooling water supply passage and the cooling water discharge passage may be dually formed and the cooling water supply passage may be formed inside the cooling water discharge passage.

The electrode includes: a supply passage formed in the interior thereof to supply one of water, an oxidizing agent, a fuel and an inert gas into the first reactor; and a porous section connected to the supply passage.

The first reactor may include a first nozzle for supplying one of water, an oxidizing agent, a fuel, and an inert gas into the first reactor.

The second reactor may include a second nozzle installed in a jet hole formed in the second reactor to supply one of water, an oxidizing agent, a fuel, and an inert gas into the second reactor.

The third reactor may include a third nozzle installed in a third reactor to supply one of water, an oxidizing agent, a fuel, and an inert gas into the third reactor.

According to the present invention, plasma can be generated by a discharge between an electrode and a first reactor by supplying a non-biodegradable gas into a first reactor in which the electrode is installed.

Further, the contact property between a reactant, i.e., a non-biodegradable gas and plasma can be improved by a gradually contracted shape of a second reactor connected to the first reactor.

Furthermore, the stay time of the non-biodegradable gas in a reactive expanded volume of high temperature can be increased by a gradually expanded shape of a third reactor connected to the second reactor, thereby expediting decomposition of the non-biodegradable gas.

Furthermore, when an inflammable gas and an oxidizing gas are supplied to the non-biodegradable gas, chemical species such as radicals necessary for decomposition of a per-fluorocompound (PFC) gas can be supplied to form a high temperature atmosphere inside a reactor and reduce power consumption.

BRIEF DESCRIPTION OF THE DRAWINGS

The objects, features and advantages of the present invention will be more apparent from the following detailed description in conjunction with the accompanying drawings, in which.

DETAILED DESCRIPTION

Figure 1:
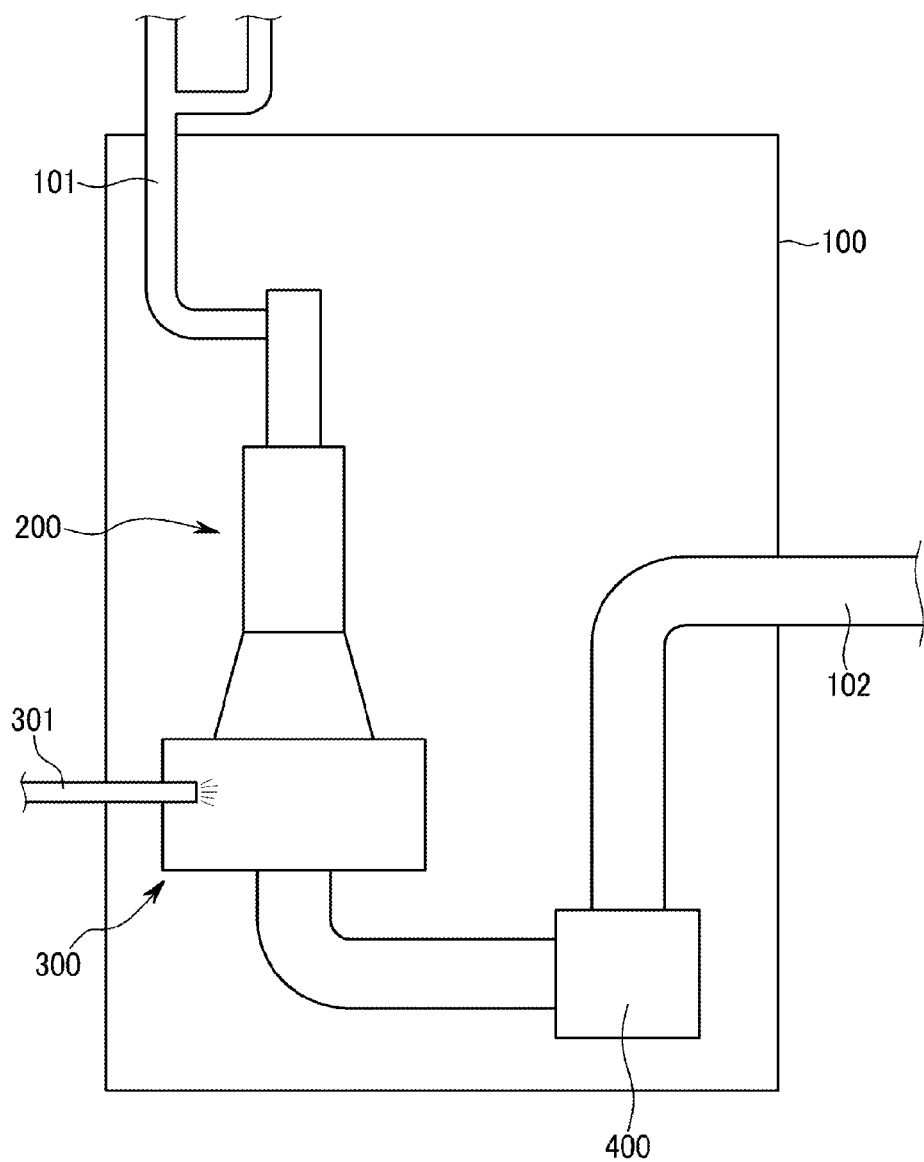
FIG. 1 is a schematic view of a non-degradable gas decomposing apparatus including a plasma scrubber according to the first embodiment of the present invention.

Hereinafter, exemplary embodiments of the present invention will be described in detail with reference to the accompanying drawings so that those skilled in the art can easily carry out the present invention. However, the present invention may be realized in various forms and is not limited to the embodiments. In the drawings, elements that are not relevant to the description of the embodiments of the present invention are omitted to make the present invention clear. The same or similar elements are endowed with the same reference numerals throughout the specification.

FIG. 1 is a schematic view of a non-biodegradable gas decomposing apparatus including a plasma scrubber according to the first embodiment of the present invention.

Referring to FIG. 1, the non-biodegradable gas decomposing apparatus includes a plasma scrubber 200 installed inside a body 100 to decompose a non-biodegradable gas, a wet scrubber 300 preventing recombination of the gas decomposed by the plasma scrubber 200, and a collector 400 collecting particles contained in the gas that has passed through the wet scrubber 300 to discharge the decomposed gas.

The non-biodegradable gas is a gas that causes global warming, and includes a per-fluorocompound (PFC) gas. For example, per-fluorocompound gases include $CF_4$, $C_2F_6$, $SF_6$, and $NF_6$ that are used in a display manufacturing process or a semiconductor manufacturing process.

A supply line 101 supplying a per-fluorocompound gas and a discharge line 102 discharging the gas obtained by decomposing the per-fluorocompound gas is connected to the body 100. The plasma scrubber 200, the wet scrubber 300, and the collector are installed inside the box 100 and are disposed between the supply line 101 and the discharge line 102.

The plasma scrubber 200 is connected to the supply line 101 to decompose and remove the non-biodegradable gas supplied to the supply line 101 using plasma reaction.

The wet scrubber 300 injects water to the gas decomposed by the plasma scrubber 200 or forces the gas to pass through a liquid space filled with water to restrain and remove recombination of the decomposed gas. For example, HF is diluted and retrieved.

The collector 400 may be a cyclone collector, and removes silicon particles such as SiH4 from the gas supplied from the wet scrubber 300. The collector 400 is connected to the discharge line 102 and the decomposed gas is discharged outside the box 100.

The wet scrubber and the collector 400 are well known in the art, and a detailed description of the illustrated nozzle 301 and the cyclone collector will be omitted.

Figure 2:
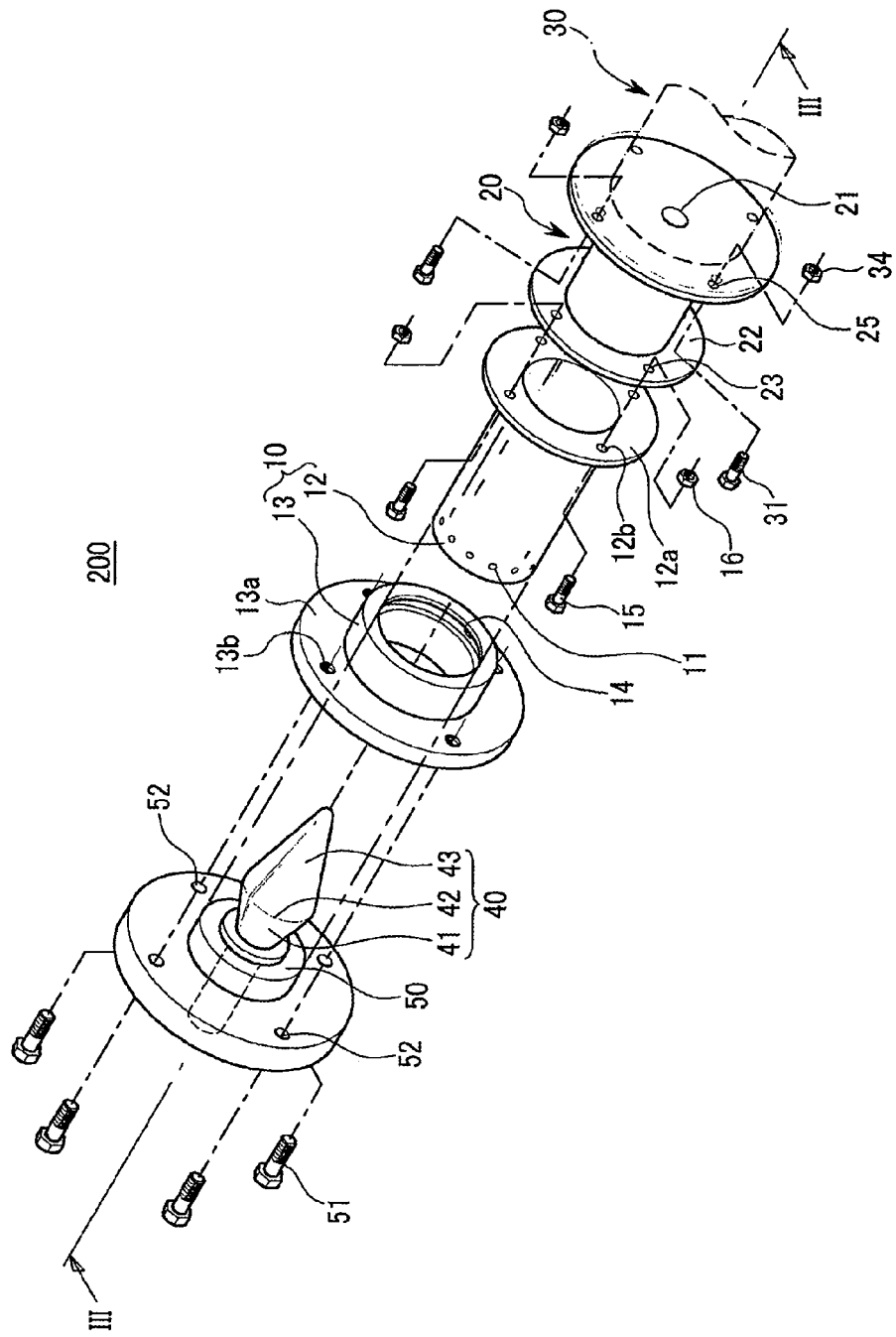
FIG. 2 is an exploded perspective view of the plasma scrubber according to the first embodiment of the present invention.
Figure 3:
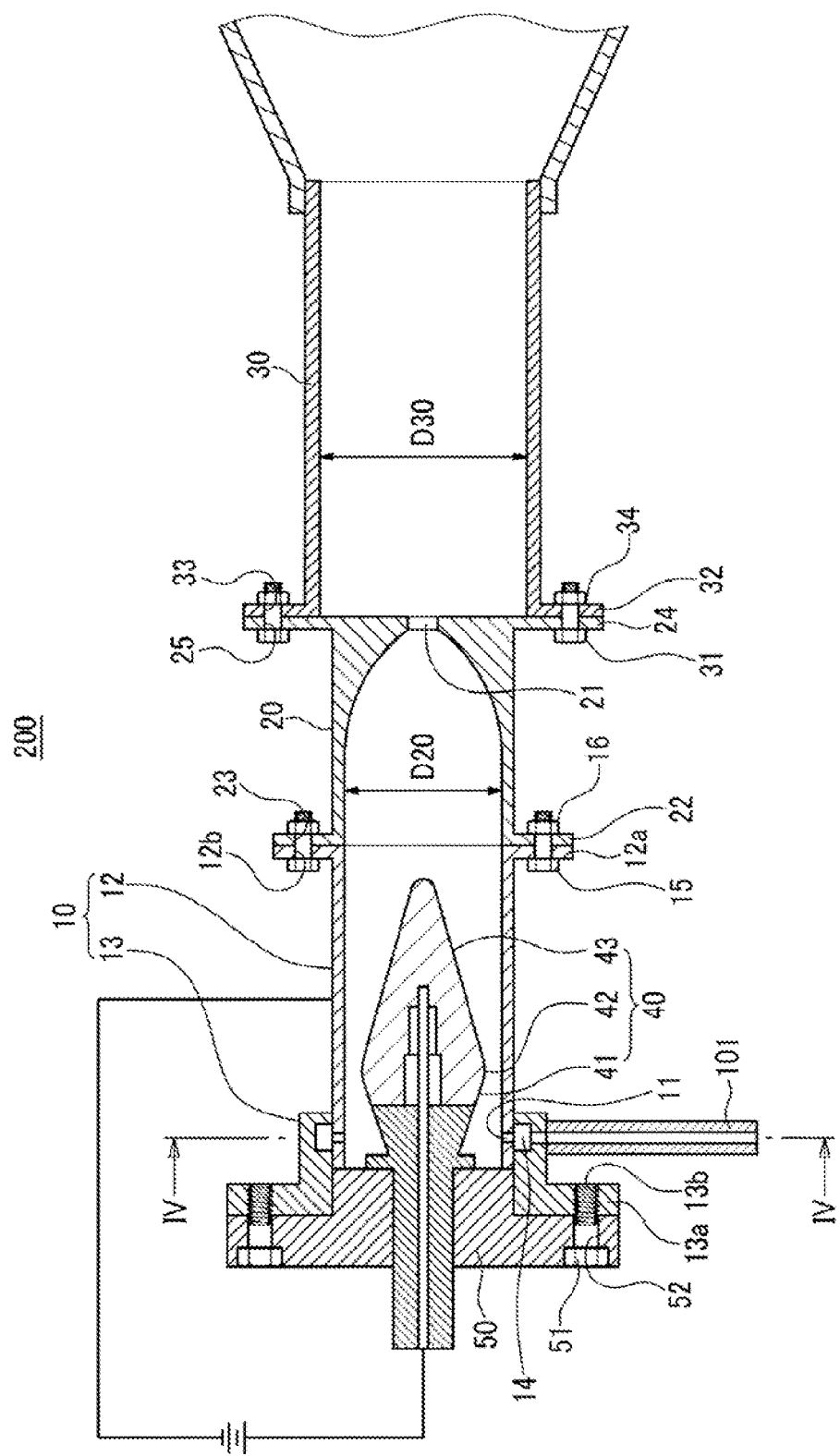
FIG. 3 is a cross-sectional view taken along line III-III of FIG. 2.

FIG. 2 is an exploded perspective view of the plasma scrubber according to the first embodiment of the present invention. FIG. 3 is a cross-sectional view taken along line III-III of FIG. 2.

Referring to FIGS. 2 and 3, the plasma scrubber 200 includes a first reactor 10, a second reactor 20, and a third reactor 30 that are sequentially disposed in the box 100, and an electrode 40 installed inside the first reactor 10.

A non-biodegradable gas is supplied to the first reactor 10 so that a discharge operation is carried out between the first reactor 10 and the electrode 40 to generate plasma. One side of the first reactor 10 is opened and the other side thereof is closed so that the plasma generated between the first reactor 10 and the electrode 40 can flow in the flow direction of the supplied non-biodegradable gas.

The electrode 40 is installed inside the first reactor 10 and protrudes in the flow direction of the non-degradable gas. A discharge is generated between the electrode 40 and the first reactor 10 by an AC or DC voltage applied to both the electrode 40 and the first reactor 10, and the inert gas and non-biodegradable gas supplied to the first reactor 10 and the electrode 40 generate plasma.

Considering flow of a non-biodegradable gas and generation of plasma, the electrode 40 changes the distance between the electrode 40 and the first reactor 10. The electrode 40 may include an expansion section, a maximum diameter section 42, and a contraction section 43 that are smoothly connected to each other.

The expansion section becomes gradually expanded toward the inner surface of the first reactor 10 as it goes from the first reactor 10 to the second reactor 20. Accordingly, the distance between the expansion section 41 and the first reactor 10 becomes gradually smaller as the expansion section 41 goes toward the maximum diameter section.

The contraction section becomes gradually contracted as it goes from the maximum diameter section 42 to the second reactor 20. Accordingly, the distance between the contraction section 43 and the first reactor 10 becomes gradually larger as the contraction section 43 becomes far away from the maximum diameter section 42.

The expansion and contraction structure of the electrode 40 installed inside the first cylindrical reactor 10 enables repetition of creation and termination of a discharge between the first reactor 10 and the electrode 40 during application of an AC or DC voltage.

The first reactor 10 has first gas supply holes 11 connected to the outside to introduce the non-biodegradable gas. The non-biodegradable gas is injected toward the expansion section of the electrode 40 through the first gas supply holes 11.

The first reactor 10 may include an inner cylinder 12 and an outer cylinder 13. The electrode 40 is installed inside the inner cylinder 40. In other words, a discharge space is formed between the electrode 40 and the inner cylinder 12. The outer cylinder 13 is coupled to the outer side of the inner cylinder 12 opposite to the second reactor 20.

The outer cylinder 13 coupled to the inner cylinder 12 includes a gas chamber 14 therein. A supply line 101 supplying a non-biodegradable gas is connected to the outer side of the outer cylinder 13.

The inner cylinder 12 includes first gas supply holes 11 for supplying the non-biodegradable gas supplied to the gas chamber 14. The first gas supply holes 11 supply the non-biodegradable gas supplied to the gas chamber 14 toward the electrode 40.

In this case, the expansion section 41 of the electrode 40 becomes gradually expanded toward the inner surface of the inner cylinder 12 to the maximum diameter section 42 as it goes from one side of the inner cylinder 12 to the opposite side thereof. The contraction section becomes gradually contracted from the maximum diameter section 42.

Figure 4:
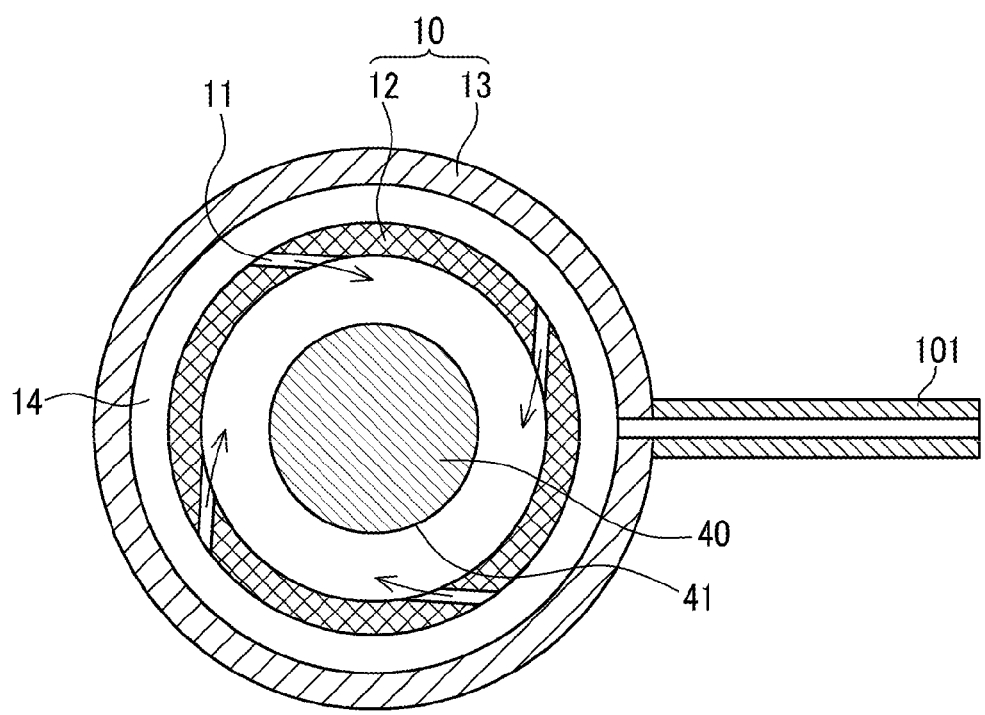
FIG. 4 is a cross-sectional view taken along line IV-IV of FIG. 3.

FIG. 4 is a cross-sectional view taken along line IV-IV of FIG. 3.

Referring to FIG. 4, the first gas supply holes 11 are inclined with respect to the normal direction of the first reactor 10 or the inner cylinder 12. Accordingly, the non-biodegradable gas supplied to the first gas supply holes 11 forms swirls between the electrode and the first reactor 10 or between the electrode and the inner cylinder 12, forming plasma swirls.

The swirls of the non-biodegradable gas induce uniform discharge between the electrode 40 and the inner cylinder 12 and enable efficient utilization of the interior space of the inner cylinder 12. The plasma swirls form tighter arc swirls in the second reactor 12.

An insulator 50 is installed in the first reactor 10 or the outer cylinder 13 on the opposite side of the second reactor 20. The insulator 50 may be variously formed according to the structure of the first reactor 10 or the outer cylinder 13.

In other words, the insulator 50 is mounted to the first reactor 10 on the opposite side of the second reactor 20, and electrically insulates and seals the first reactor 10 and the electrode 40. The insulator 50 may be made of ceramics of high heat-resistance.

More particularly, the insulator 50 is mounted to the outer cylinder 13 on the opposite side of the second reactor 20, and electrically insulates and seals the electrode 40 and the inner cylinder 12.

Bolts 51 are inserted through through-holes 52 formed in the insulator 50 and are screw-coupled to coupling holes 13b formed in a flange 13a of the outer cylinder 13 of the first reactor 10 and corresponding to the through-holes 52, whereby the insulator 50 and the outer cylinder 13 of the first reactor 10 are connected to each other. The insulator 50 and the first reactor 10 may form a simple structure (not shown) using welding of an insulator case (not shown) to the first reactor.

A discharge may occur between the electrode 40 to which an AC or DC voltage is applied and the first reactor 10 or between the electrode 40 and the inner cylinder 12 due to insulation of the insulator 50, whereby a plasma reaction space is formed to decompose the non-biodegradable gas.

The second reactor 20 is connected to the first reactor 10 to form an arc jet by increasing the density of plasma. The internal passage of the second reactor 20 becomes gradually narrower as it goes from the first reactor 10 to the third reactor 30. A jet hole 21 is formed at an end of the second reactor 20.

Bolts 15 pass through through-holes 12b formed in a flange 12a of the inner cylinder 12 of the first reactor 10 and through-holes 23 formed on a flange 22 of the second reactor 20 and are screw-coupled to nuts 16 to connect the inner cylinder 12 of the first reactor 10 and the second reactor 20.

Actually, the first reactor 10, the second reactor 20, and the third reactor 30 may be simply manufactured by welding in a process of manufacturing the non-biodegradable gas decomposing apparatus according to the embodiment of the present invention.

The shape of the second reactor 20 having an inner diameter D20 that becomes gradually narrower enables the continuously generated arcs to pass through the jet hole 21 formed at a connection point of the second reactor 20 and the third reactor 30. Accordingly, the contact property of the non-biodegradable gas with the plasma region increases while the non-biodegradable gas passes through the jet hole 21, increasing reaction efficiency.

The third reactor 30 is connected to the second reactor 20 to provide an expanded reaction space of a reactive high temperature atmosphere. The third reactor 30 is connected to the jet hole 21 of the second reactor 20 and has an inner diameter larger than the maximum inner diameter D20 of the second reactor 20.

Bolts 31 pass through through-holes 25 formed in another flange 24 of the second reactor 20 and through-holes 33 formed in a flange 32 of the third reactor 30 and are screw-coupled to nuts 34, whereby the second reactor 20 and the third reactor 30 are connected to each other.

The third reactor 30 is connected to the jet hole 21 and has a rapidly expanded shape, in which case an expansion section of high temperature is formed. Accordingly, the time for staying a reactant, i.e., the non-biodegradable gas, stays in the expansion section increases, expediting decomposition of the non-biodegradable gas.

If discharge of the first reactor 12 starts, a plasma arc is continuously generated by the reactor characteristics and flow characteristics of the first reactor 12 while passing through the jet hole 21. The plasma arc is expanded in the third reactor 30 to form a condition advantageous in plasma reaction. In this case, the plasma arc is stably discharged with the arc not being detached from the electrode 40 but being anchored to the electrode 40.

In this state, the temperatures of the reaction spaces of the first, second, and third reactors 10, 20, and 30 increase up to a temperature suitable for decomposition of the non-biodegradable gas, with the heat of the gaseous reactant being easily transferred.

An inflammable gas and an oxidizing agent may be used to decompose the non-biodegradable gas. In this case, the inflammable gas and the oxidizing agent are supplied through the first gas supply holes 11 through which the non-biodegradable gas is supplied.

When the non-biodegradable gas contains the inflammable gas and the oxidizing agent, the high temperature state formed by oxidation optimizes the plasma characteristics, improving transfer of heat into the interior spaces of the first, second, and third reactor 10, 20, and 30.

If the reaction region is maintained at a low density with high temperature, the average number of collisions of electrons increases due to the low density. The increased average number of collisions of electrons induces acceleration of electrons, thereby generating a large number of electrons having high energy and expediting decomposition of the non-biodegradable gas.

Reactive radicals necessary for removal of the non-biodegradable gas are produced in the oxidation of the inflammable gas and the oxidizing agent or the decomposition of the inflammable gas and the oxidizing agent, expediting decomposition of the non-biodegradable gas.

For example, during decomposition of $CF_4$, i.e., a perfluorocompound (PFC), $CF_4$ is contained in nitrogen gas to be injected to rotating arc, in which case the decomposition ratio of $CF_4$ is low, being in the range of from several to several tens of percent at several kilowatts with respect to the flow rate of 5 to 10 $Nm^3/hr$.

However, if $CF_4$ and $O_2$, i.e., an inflammable gas and an oxidizing agent, are supplied as a partial oxidation condition, the decomposition ratio of $CF_4$ increases up to 80 to 90% at the same power value.

Recombination of the decomposed gas is restrained by the wet scrubber 300 and it is discharged through the discharge line 102, resolving and removing HF formed in the decomposition process and removing particles through the collector 400.

Hereinafter, other various embodiments of the present invention will be illustrated. The other embodiments of the present invention are similar to the first embodiment of the present invention. Accordingly, description of the same or similar parts will be omitted and different points will be mainly described in detail.

Figure 5:
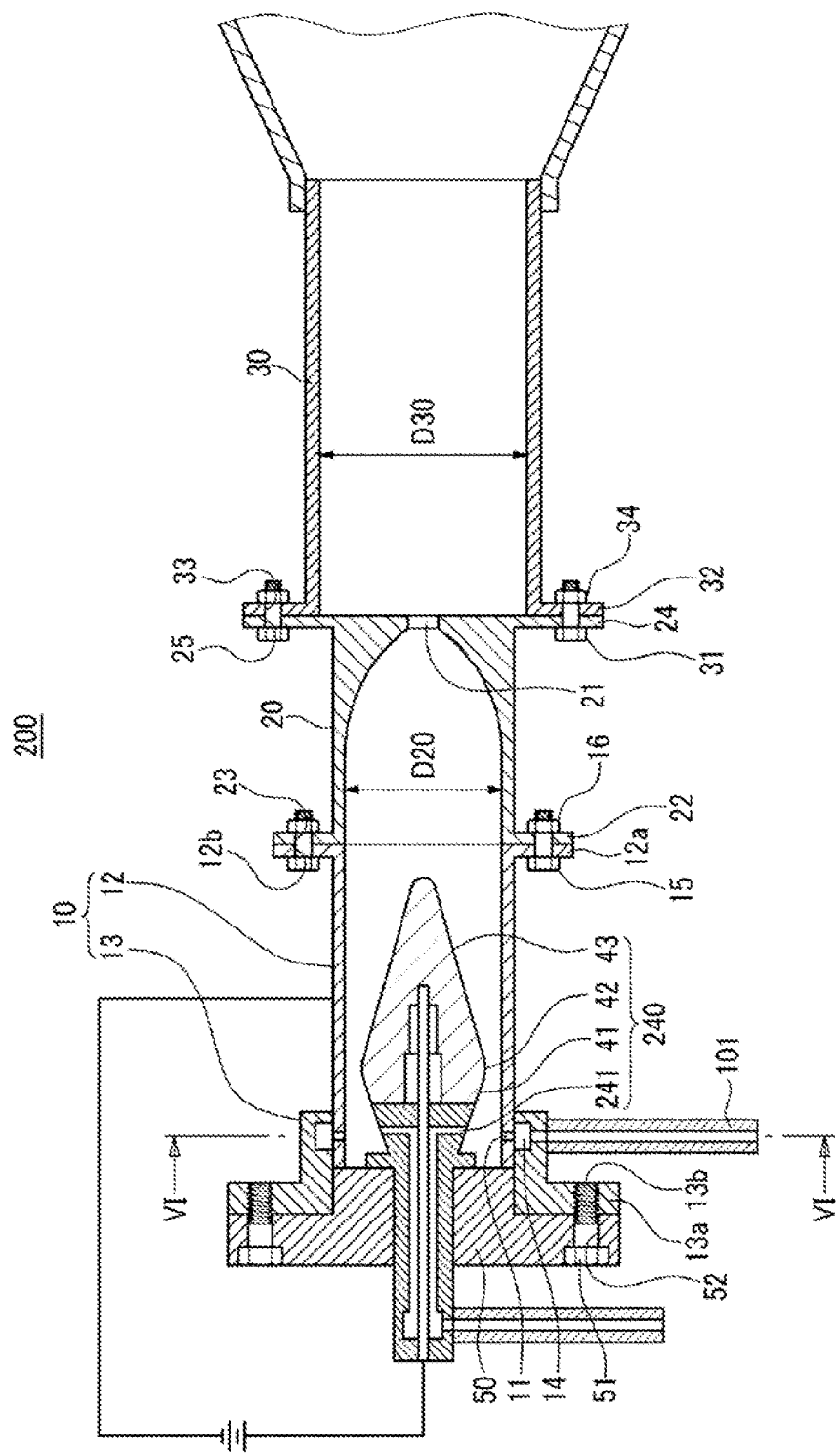
FIG. 5 is a cross-sectional view of a plasma scrubber according the second embodiment of the present invention.

FIG. 5 is a cross-sectional view of a plasma scrubber according the second embodiment of the present invention.

A non-biodegradable gas is supplied from outside of the electrode 40 in the first embodiment, but is supplied to the interior of the electrode 240 in the second embodiment of the present invention.

In FIG. 5, a non-biodegradable gas is supplied from outside of an electrode 240 and is also supplied through the interior of the electrode 240. For convenience sake, additional structures will be described in detail in the second embodiment of the present invention.

The electrode 240 includes second gas supply holes 241 connected to the outside. The second gas supply holes 241 are formed toward the inner cylinder 12 of the first reactor 10 at the expansion section of the electrode 240 formed inside the electrode 240.

Figure 6:
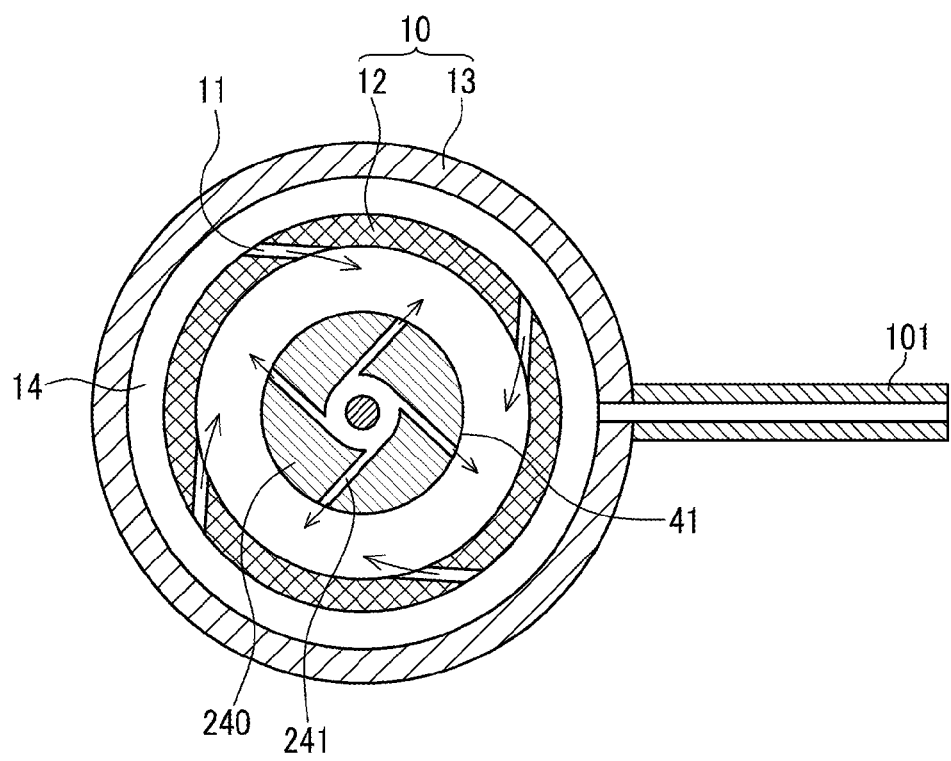
FIG. 6 is a cross-sectional taken along line VI-VI of FIG. 5.

FIG. 6 is a cross-sectional taken along line VI-VI of FIG. 5.

Referring to FIG. 6, the second gas supply holes 241 are inclined with respect to the normal direction of the expansion section 41 of the electrode 240. Accordingly, the non-biodegradable gas supplied to the second gas supply holes 241 forms swirls between the electrode 240 and the first reactor 10 or between the electrode 240 and the inner cylinder 12, forming plasma swirls.

The ends of the second gas supply holes 241 and the ends of the first gas supply holes 11 cross each other between the first reactor 10 and the electrodes 40 and 240. Accordingly, the swirls of the non-biodegradable gas supplied through the second gas supply holes 241 makes the swirls of the non-biodegradable gas supplied through the first gas supply holes 11 stronger.

Figure 7:
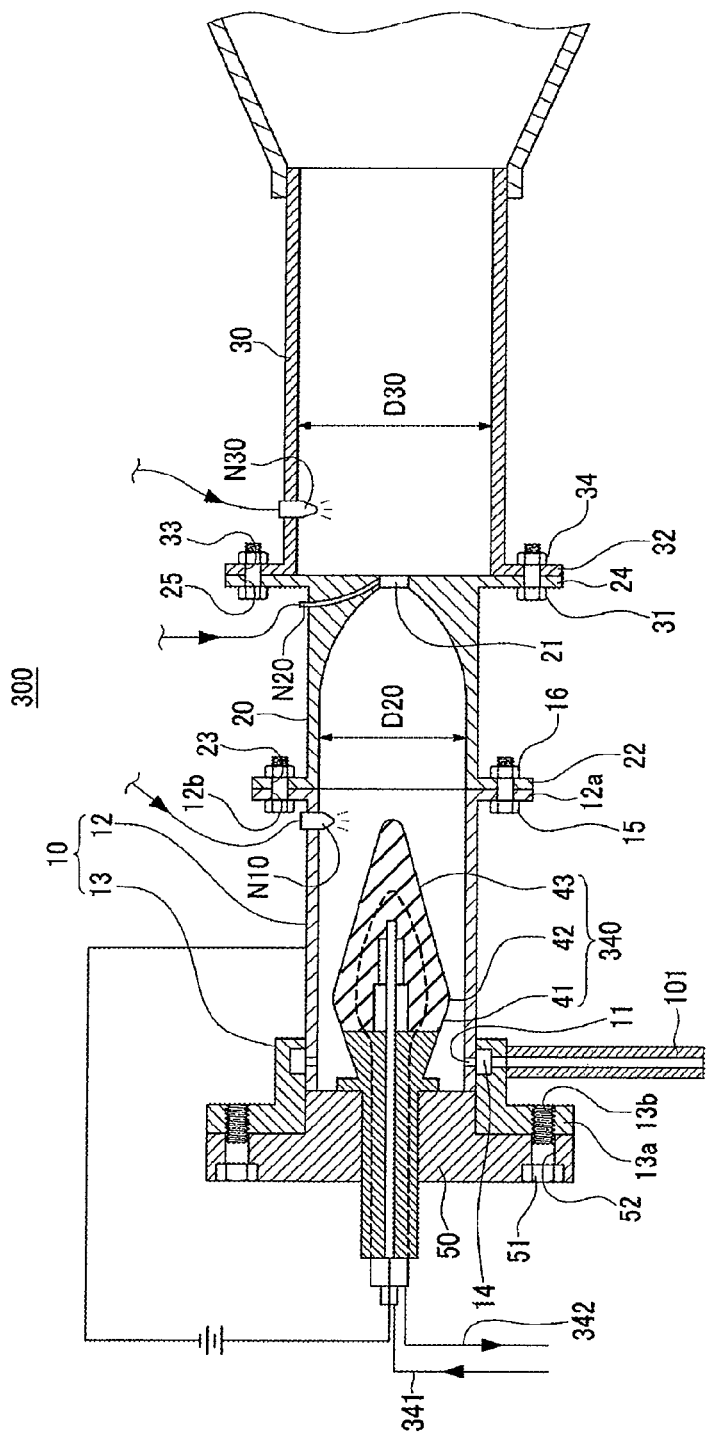
FIG. 7 is a cross-sectional view of a plasma scrubber according to the third embodiment of the present invention.
Figure 8:
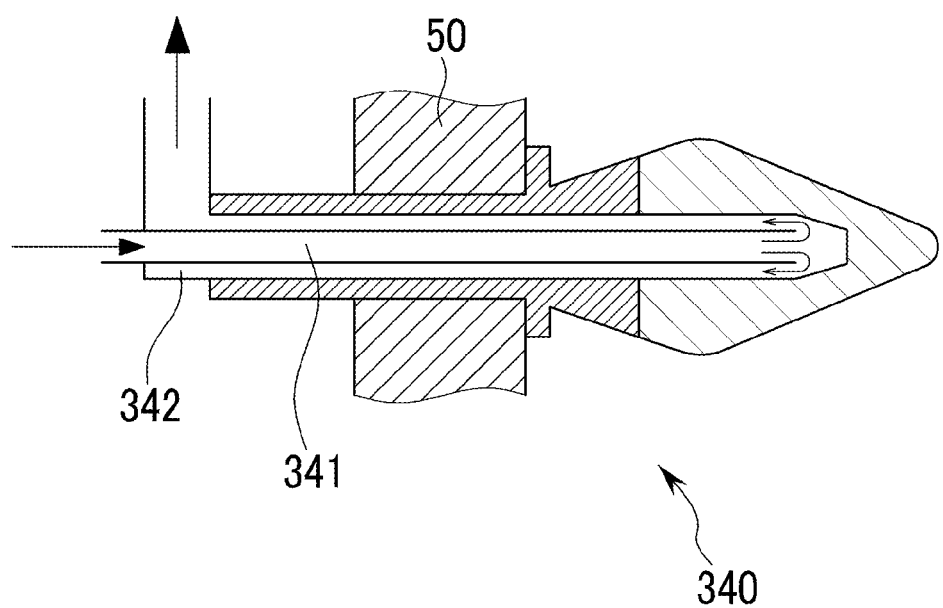
FIGS. 8 and 9 are cross-sectional views of electrodes applied to the plasma scrubber of FIG. 7.
Figure 9:
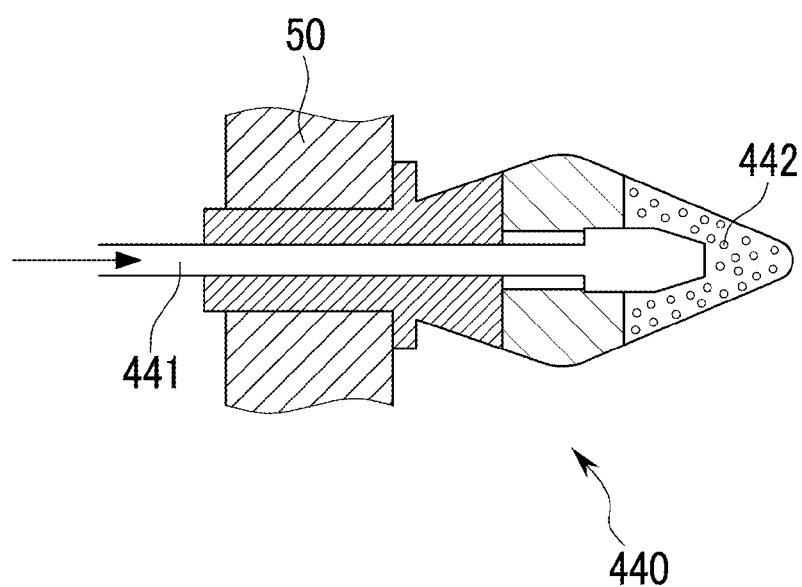

FIG. 7 is a cross-sectional view of a plasma scrubber according to the third embodiment of the present invention. FIGS. 8 and 9 are cross-sectional views of electrodes applied to the plasma scrubber of FIG. 7.

Referring to FIGS. 7 and 8, a cooling water supply passage 341 and a cooling water discharge passage 342 that discharge cooling water after cooling water is supplied into the interior of an electrode 340 to be circulated are formed in an electrode 340.

The cooling water supply passage 341 and the cooling water discharge passage 342 are dually formed. For example, the cooling water supply passage 341 is formed inside the cooling water discharge passage 342.

Accordingly, cooling water of low temperature is supplied to the cooling water supply passage 341 to cool the electrode 340 heated by a plasma discharge, and is discharged through the cooling water discharge passage. Therefore, the electrode 340 can be prevented from being overheated.

Referring to FIG. 9, a supply passage 441 formed inside the electrode 440 to directly supply an additive, i.e., one of water, an oxidizing agent, a fuel, and an inert gas into the interior of the first reactor 10 and a porous portion 442 connected to the supply passage 441 are formed in the electrode 440.

The additive supplied through the supply passage 441 is supplied between the electrode 440 and the first reactor 10, making a continuous arc jet due to a plasma discharge stronger.

Referring now to FIG. 7 again, the first reactor 10 includes a first nozzle N10. An additive, i.e., one of water, an oxidizing agent, a fuel, and an inert gas is supplied through the first nozzle N10 into the interior of the first reactor 10.

The second reactor 20 includes a second nozzle N20. An additive, i.e., one of water, an oxidizing agent, a fuel, and an inert gas is supplied through the second nozzle N20 into the interior of the second reactor 20.

The third reactor 30 includes a second nozzle N20. An additive, i.e., one of water, an oxidizing agent, a fuel, and an inert gas is supplied through the third nozzle N30 into the interior of the third reactor 30.

The first, second, and third nozzles N10, N20, and N30 may be used in one plasma scrubber 300 all together or may be selectively used.

The additive supplied to the first, second, and third nozzles N10, N20, and N30 makes a continuous arc jet due to a plasma discharge stronger in the first, second, and third reactors 10, 20, and 30.

While the invention has been shown and described with respect to the exemplary embodiments, it will be understood by those skilled in the art that the system and the method are only examples of the present invention and various changes and modifications may be made without departing from the spirit and scope of the invention as defined in the following claims.

What is claimed is:

1. A plasma scrubber comprising:
   a first cylindrical reactor to which non-biodegradable gas is supplied and a voltage is applied;
   an insulator coupled to one end of the first cylindrical reactor and closing the one end of the first cylindrical reactor;
   an electrode to which a voltage is applied, the electrode having one end coupled to the insulator and insulated from the first cylindrical reactor and an opposite end received in the first cylindrical reactor and spaced apart from an inner surface of the first cylindrical reactor, the electrode having an expansion section that gradually expands toward the inner surface of the first cylindrical reactor along the length of the electrode in a direction from the first reactor to the second reactor; a maximum diameter section formed at one end of the expansion section; and a contraction section that gradually contracts away from the inner surface of the first cylindrical reactor along the length of the electrode in a direction from the first reactor to the second reactor; the electrode including a sharp end centered on an axis;

a second cylindrical reactor having one end coupled with an open end of the first cylindrical reactor, the one end of the second cylindrical reactor having an inner diameter approximately equal to an inner diameter of the first cylindrical reactor, the second cylindrical reactor including an end section opposite the one end having an inner diameter that gradually decreases along a length of the end section reactor in the direction from the first reactor to the second reactor, an end of the end section forms a closed end, the closed end including a jet hole centered on the axis;

a third cylindrical reactor coupled with the closed end of the second cylindrical reactor and having an inner diameter larger than the inner diameter of the one end of the second cylindrical reactor; and wherein the first cylindrical reactor includes first gas supply holes and the first gas supply holes face the expansion section of the electrode;

wherein the electrode includes second gas supply holes and the second gas supply holes face the first cylindrical reactor from the expansion section; and wherein the electrode includes: a supply passage formed in the interior of the electrode to supply one of water, an oxidizing agent, a fuel and an inert gas into the first cylindrical reactor; and a porous section connected to the supply passage.

2. The plasma scrubber of claim 1, wherein the first cylindrical reactor includes:

an inner cylinder in which the electrode is positioned; and an outer cylinder coupled to an outer side of the inner cylinder on the end opposite the second cylindrical reactor.

3. The plasma scrubber of claim 2, further comprising a supply line for supplying non-biodegradable gas connected to an outer side of the outer cylinder, a gas chamber formed inside the outer cylinder and coupled to the supply line, and first gas supply holes formed in the inner cylinder, wherein the first gas supply holes face toward the electrode.

4. The plasma scrubber of claim 2, wherein the insulator is mounted to the outer cylinder and electrically insulates the electrode from the inner cylinder and seals the outer cylinder to the electrode.

5. The plasma scrubber of claim 1, wherein the non-biodegradable gas is a per-fluoro compound gas.

6. The plasma scrubber of claim 1, wherein the non-biodegradable gas is one of $CF_4$, $C_2F_6$, $SF_6$, and $NF_3$.

7. The plasma scrubber of claim 1, further comprising a cooling water supply passage and a cooling water discharge passage within the electrode for supplying cooling water into the electrode, and circulating and discharging the cooling water from the electrode.

8. The plasma scrubber of claim 7, wherein the cooling water supply passage is located inside the cooling water discharge passage.

9. The plasma scrubber of claim 1, wherein the first cylindrical reactor includes a first nozzle for supplying one of water, an oxidizing agent, a fuel, and an inert gas into the first cylindrical reactor.

10. The plasma scrubber of claim 1, wherein the second cylindrical reactor includes a second nozzle communicating with the jet hole formed in the second reactor, the second nozzle for supplying one of water, an oxidizing agent, a fuel, and an inert gas into the second reactor.

11. The plasma scrubber of claim 1, wherein the third reactor includes a third nozzle communicating with the third reactor to supply one of water, an oxidizing agent, a fuel, and an inert gas into the third reactor.

* * * * *